United States Patent
Yoon et al.

(10) Patent No.: US 11,772,051 B2
(45) Date of Patent: Oct. 3, 2023

(54) CHARGE NEUTRAL BIOCIDE DOSING CONTROL FOR MEMBRANE BIOFOULING CONTROL APPLICATIONS

(71) Applicant: Ecolab USA Inc., Saint Paul, MN (US)

(72) Inventors: Seong-Hoon Yoon, Naperville, IL (US); Geoff Townsend, Bury St. Edmunds (GB); Bruno C. M. Fernandes, Rijswijk (NL); Alessandra Gerli, Leiden (NL); Ana Urmenyi, Utrecht (NL); Muhammad Tariq Khan, Thuwal (SA)

(73) Assignee: Ecolab USA Inc., Saint Paul, MN (US)

( * ) Notice: Subject to any disclaimer, the term of this patent is extended or adjusted under 35 U.S.C. 154(b) by 11 days.

(21) Appl. No.: 17/233,793

(22) Filed: Apr. 19, 2021

(65) Prior Publication Data
US 2021/0322928 A1 Oct. 21, 2021

Related U.S. Application Data

(60) Provisional application No. 63/012,556, filed on Apr. 20, 2020.

(51) Int. Cl.
*B01D 65/02* (2006.01)
*C02F 1/44* (2023.01)
(Continued)

(52) U.S. Cl.
CPC ............ *B01D 65/022* (2013.01); *C02F 1/441* (2013.01); *C02F 1/686* (2013.01); *C02F 1/72* (2013.01);
(Continued)

(58) Field of Classification Search
CPC ...... B01D 61/04; B01D 61/12; B01D 65/022; B01D 2311/12; B01D 2311/2634; B01D 2311/2638
See application file for complete search history.

(56) References Cited

U.S. PATENT DOCUMENTS

| 4,792,404 A | 12/1988 | Swedo et al. |
| 4,804,478 A | 2/1989 | Tamir |

(Continued)

FOREIGN PATENT DOCUMENTS

| EP | 2990386 A1 | 3/2016 |
| GB | 2326113 A | 12/1998 |

(Continued)

OTHER PUBLICATIONS

A Literature Review of the Effects of ClO2 and RO Membranes, Siemens Water Technologies, 2009, 4 pages.
(Continued)

*Primary Examiner* — Bradley R Spies
(74) *Attorney, Agent, or Firm* — Fredrikson & Byron, P.A.

(57) ABSTRACT

Biocide can be controllably added to a feed stream for a membrane. The membrane can separate the feed stream into a purified permeate stream and a concentrate stream containing contaminants from the feed stream. In some examples, a charge neutral biocide is introduced into the feed stream at a first addition rate. The concentration of the charge neutral biocide in the permeate stream is measured to provide a measured concentration of the charge neutral biocide in the permeate stream. The addition rate of the charge neutral biocide can be adjusted based on the measured concentration of the charge neutral biocide in the permeate stream to introduce charge neutral biocide into the feed stream at a second addition rate different than the first addition rate.

20 Claims, 3 Drawing Sheets

(51) Int. Cl.
   *C02F 1/68* (2023.01)
   *C02F 1/72* (2023.01)

(52) U.S. Cl.
   CPC .... *B01D 2311/04* (2013.01); *B01D 2311/246* (2013.01); *B01D 2311/2634* (2013.01); *B01D 2311/2638* (2013.01); *B01D 2321/162* (2013.01); *B01D 2321/168* (2013.01); *B01D 2321/40* (2013.01); *C02F 2209/003* (2013.01); *C02F 2209/04* (2013.01); *C02F 2209/40* (2013.01); *C02F 2303/185* (2013.01); *C02F 2303/20* (2013.01)

(56) References Cited

U.S. PATENT DOCUMENTS

| | | | |
|---|---|---|---|
| 6,699,684 | B2 | 3/2004 | Ho et al. |
| 6,733,654 | B1 | 5/2004 | Itzhak |
| 6,838,002 | B2 | 1/2005 | Zeiher et al. |
| 7,476,320 | B1 | 1/2009 | Koons |
| 8,101,083 | B2 | 1/2012 | Ruehr et al. |
| 9,079,137 | B2 | 7/2015 | Sim et al. |
| 2005/0061741 | A1 | 3/2005 | Mainz et al. |
| 2008/0149570 | A1 | 6/2008 | Zeiher et al. |
| 2010/0096326 | A1 | 4/2010 | Najmy et al. |
| 2014/0083931 | A1 | 3/2014 | Chang et al. |
| 2016/0271565 | A1 | 9/2016 | Liu et al. |

FOREIGN PATENT DOCUMENTS

| | | |
|---|---|---|
| WO | 0048943 A1 | 8/2000 |
| WO | 2004009497 A2 | 1/2004 |
| WO | 2005009908 A2 | 2/2005 |
| WO | 2008091453 A1 | 7/2008 |
| WO | 2013051192 A1 | 4/2013 |
| WO | 2014176082 A1 | 10/2014 |
| WO | 2019031430 A1 | 2/2019 |
| WO | 2019036787 A1 | 2/2019 |

OTHER PUBLICATIONS

Adams, "The Effects of Chlorine Dioxide on Reverse Osmosis Membranes," Desalination, vol. 78, 1990, pp. 439-453.
Al-Abri et al., "Chlorination disadvantages and alternative routes for biofouling control in reverse osmosis desalination," NPJ Clean Water, vol. 2, No. 2, Jan. 16, 2019, 16 pages.
Cran et al., "Degradation of polyamide reverse osmosis membranes in the presence of chloramine," Desalination, vol. 283, 2011, pp. 58-63.
Eriksson et al., "Field Experience: Can Chlorine Dioxide Be Used as a Biocide in RO Plants?" IDA Journal, First Quarter 2012, pp. 14-20.
FILMTEC Membranes Cleaning and Sanitization: Sanitizing RO & NF Membrane Systems, Tech Manual Excerpt, the Dow Chemical Company, published prior to Nov. 1, 2019, 2 pages.
Hoek, Ph.D, "Reverse Osmosis Membrane Biofouling: Causes, Consequences and Countermeasures," Water Planet, Inc., Jul. 13, 2017, 9 pages.
Ohno et al., "Effect of coexisting metal ions on the degradation of polyamide reverse osmosis membrane by hypochlorite treatment," Desalination, vol. 381, 2016, pp. 126-134.
Tseng et al., "Chlorine dioxide application for microbial control on polyamide membranes during seawater desalination," Long Beach Water Department, American Waterworks Association 2009 Water Quality Technology Conference, Powerpoint and paper, Nov. 15-18, 2009, 47 pages.
Yoon et al., "Accurate Biocide Dosing for Low Concentration Membrane Biofouling Control Applications," Unpublished U.S. Appl. No. 17/085,905, filed Oct. 30, 2020, 33 pages.
You et al., "Control of Metal Oxide Fouling in Reverse Osmosis," IWA North American Membrane Research Conference, IDA Journal, First Quarter 2008, 10 pages.
Sheikholeslami, R., and J. Bright. "Silica and metals removal by pretreatment to prevent fouling of reverse osmosis membranes." Desalination 143.3 (2002): 255-267.
Kim, Dooil, et al. "Biocide application for controlling biofouling of SWRO membranes-an overview." Desalination 238.1-3 (2009): 43-52.
International Patent Application No. PCT/US2021/027898, International Search Report and Written Opinion dated Jun. 28, 2021, 13 pages.

CHARGE NEUTRAL BIOCIDE DOSING CONTROL FOR MEMBRANE BIOFOULING CONTROL APPLICATIONS

RELATED MATTERS

This application claims the benefit of U.S. Provisional Patent Application No. 63/012,556, filed Apr. 20, 2020, the entire contents of which are incorporated herein by reference.

TECHNICAL FIELD

This disclosure relates to membrane systems and to the control of biocide agents in membrane systems.

BACKGROUND

Membrane separation is a technology that selectively separates materials via pores and/or minute gaps in the molecular arrangement of a continuous membrane structure. Membrane separations can be classified by pore size and by the separation driving force. Example membrane separation techniques include microfiltration (MF), ultrafiltration (UF), ion-exchange (IE), nanofiltration (NF), and reverse osmosis (RO). For example, reverse osmosis is widely used in water purification processes to remove ions, bacteria, and other molecules and larger particles from the water. In a reverse osmosis process, an applied pressure is used to overcome an osmotic pressure across the membrane, allowing substantially pure solvent (e.g., water) to pass through the membrane while a residual solute is retained on the pressurized side of the membrane.

In practice, the degree of purification achieved using the membrane separation process is dictated, at least in part, by the quality and integrity of the membrane used in the process. If there are chemical and/or mechanical failures to the membrane structure, impurities can pass through the membrane breach and into the resulting "purified" product stream. In the case of water purification, harmful impurities and pathogens (e.g., waterborne enteric viruses, Cryptosporidium, Giardia cysts, nanoparticles, organic compounds, and so forth), which can be in the nanosize range, can pass through the membrane breach into the clean water stream, potentially creating health risks.

One issue that can impact the quality of a membrane separation process is biofouling. Biofouling can occur when microbes grow on the surface of the membrane. When biofouling occurs on surface of a reverse osmosis membrane or nanofiltration membrane, the biofouling can negatively impact the osmotic pressure of the membrane. Biofouling can also reduce the flow rate and quality of the water produced by the membrane. As a result, during the operation of the membrane system, one or more chemicals may be applied to control biofouling.

SUMMARY

In general, this disclosure is directed to systems and techniques for controlling the addition of one or more chemical agents to a membrane separation process, such as a biocide. The membrane separation process may utilize a feed stream that contacts a membrane to produce a permeate stream in a concentrate stream. In some examples, the described systems and techniques are used to control addition of a charge neutral biocide to a feed stream for the membrane separation process. A charge neutral biocide may be a biocide that does not have a net electrical charge. As a result, the charge neutral biocide may pass through the membrane and into the permeate stream rather than be rejected by the membrane and pass into the concentrate stream. This can be beneficial to generate a permeate stream having a controlled amount of biocide in the permeate stream. Biocide in the permeate stream can help establish and maintain the biocidal activity of the stream for downstream storage and/or use.

In some implementations, the charge neutral biocide is added to the feed stream upstream of the membrane and the concentration of the charge neutral biocide is further measured downstream of the membrane in the permeate stream. The measured concentration of the biocide downstream of the membrane can then be used to control the addition of biocide to the feed stream upstream of the membrane. For example, the amount of biocide added to the feed stream upstream of the membrane may be increased or decreased until the concentration of biocide downstream of the membrane equals or exceeds a concentration target. This can be useful to ensure that the permeate stream produced through the membrane separation process contains a threshold amount of biocide. For example, in residential or commercial water production, it may be desirable to have a threshold amount of biocide in the purified water stream to ensure the biocidal activity of the water for subsequent distribution, storage, and/or use.

In practice, a feed stream utilized in a membrane separation process may undergo one or more pretreatment processes before undergoing membrane separation. For example, the feed stream may be treated with an oxidant to disinfect the feed stream before contacting a downstream membrane. Since an oxidant used in the disinfecting process may damage the membrane itself, a reducing agent may be added to the feed stream upstream of the membrane but downstream of where the oxidant is introduced to the feed stream.

The amount of reducing agent added to the feed stream may be in excess of the amount of oxidant added to the feed stream, e.g., to help ensure that all the oxidizing agent is reacted and does not damage the membrane. In instances where a threshold amount of charge neutral biocide is desired in the permeate stream, however, the reducing agent may react with the charge neutral biocide also added to the feed stream. This can increase the amount of charge neutral biocide required to be added to the feed stream to achieve the target threshold in the permeate stream. Further, this can create dynamic control challenges in situations where the chemical demand for the reducing agent is changing as the system is also attempting to control the introduction of biocide based on the measured concentration of biocide in the permeate stream.

In some examples, the concentration of the oxidizing agent is measured downstream of the location where the oxidizing agent is injected into the stream and upstream of where the reducing agent is added to the feed stream. This measurement location may also be upstream of where the charge neutral biocide is added to the feed stream. The amount of reducing agent added to the feed stream can be controlled based on the measured amount of oxidizing agent. For example, the amount of reducing agent may be controlled so that there is little or no excess reducing agent added to the feed stream. The charge neutral biocide can be introduced to the feed stream at a location downstream of where the reducing agent is added to the feed stream, e.g., at a location sufficiently far away from where the reducing agent is added to provide a residence time allowing substantially all of the reducing agent to react.

The biocide introduced into the feed stream can reduce or inhibit biofouling on the membrane itself and, in some implementations, provide biocidal activity to the permeate stream produced through the membrane separation process. Under typical operating conditions, the biocide may the introduced into the feed stream and contact the membrane without causing substantial membrane oxidation, which can damage the structure of the membrane. If the feed stream contains metal ions (e.g., a sufficiently high concentration of metal ions), however, the metal ions may function to catalyze reaction between the biocide and the membrane. For these and other reasons, in some examples, the concentration of one or more metal ions present in the feed stream may be limited. For example, the concentration of one or more metal ions present in the feed stream may be measured and, if the concentration exceeds a threshold, one or more treatment steps performed to remove and/or bind the metal ions. This can prevent or limit catalyzed degradation of the membrane by the biocide.

In one example, a method of controlling addition of a charge neutral biocide in a membrane separation process is described. The method includes introducing a charge neutral biocide into a feed stream at a first addition rate and contacting a membrane with the feed stream, thereby generating a permeate stream and a concentrate stream. The method further involves measuring a concentration of the charge neutral biocide in the permeate stream to provide a measured concentration of the charge neutral biocide in the permeate stream and adjusting an addition rate of the charge neutral biocide based on the measured concentration of the charge neutral biocide in the permeate stream to introduce the charge neutral biocide into the feed stream at a second addition rate different than the first addition rate.

In another example, a system is described that includes a biocide pump configured to introduce a charge neutral biocide into a feed stream and a membrane configured to separate the feed stream into a permeate stream and a concentrate stream. The system also includes a sensor configured to measure a concentration of the charge neutral biocide in the permeate stream to provide a measured concentration of the charge neutral biocide in the permeate stream. The system further includes a controller communicatively coupled to the biocide pump and the sensor, the controller being configured to control the biocide pump to adjust an addition rate of charge neutral biocide into the feed stream based on the measured concentration of the charge neutral biocide in the permeate stream.

The details of one or more examples are set forth in the accompanying drawings and the description below. Other features, objects, and advantages will be apparent from the description and drawings, and from the claims.

DETAILED DESCRIPTION

This disclosure is generally directed to systems and technique for controlling addition of one or more chemical agents, such as a biocide, to a membrane separation process having one or more membrane separation devices. The membrane separation device may be a reverse osmosis membrane (RO), a nanofiltration membrane (NF), or other type of membrane separation device, such as an ultrafiltration membrane (UF), microfiltration membrane (MF) and/or electrodialysis (ED) membrane. The form of the membrane is not limited, and any type of membrane module may be used such as spiral wound type membrane module, hollow-fiber membrane module, tubular type membrane module, and plane type membrane module. Although the membrane separation process can be used for any desired application, the separation process may commonly be deployed for water treatment and the preparation of water such as drinking water, pure water, ultra-pure grade water, process water for electricity, electronic and/or semiconductor industries, process water for the medical field, water for agents, water for injection, aseptic pyrogen-free pure water, process water of food and beverage uses, water for a boiler, and/or water for washing and cooling. A membrane separation processes can also be applied to fields such as the desalination of seawater or brackish water.

In water treatment applications, a polluting substance, solubilized substance, and/or ionic substance existing in the water to be treated may be separated using the above various kinds of membrane separation devices. In operation, however, microbes present in the water to be treated may deposit on the piping line and/or on the surface of membrane in the membrane separation device. This can result in the formation of a biofilm and biofouling, which may influence the osmotic pressures between two sides of the membrane. This can impact the water yield passing through the membrane, block the membrane, and/or deteriorate the efficiency of the treatment for impurities.

In general, this disclosure describes systems and techniques for controlling the addition of one or more biocides to water upstream of a membrane separation device. The biocide may be added in an amount effective to inhibit biofouling growth in the membrane separation device and/or remove accumulated biofouling in a membrane separation device. Additionally or alternatively, the biocide may be added in an amount effect to provide a target biocide concentration/biocidal activity level to a permeate stream produced by the membrane separation device.

For example, in some implementations, the biocide added upstream of the membrane separation device passes through the membrane into the permeate stream without being substantially rejected by the membrane. This can provide residual biocidal activity to the permeate stream. The amount of biocide added to the feed stream may be controlled based on the amount of biocide measured in the permeate stream downstream of the membrane. For example, the amount of biocide added to the feed stream may be adjusted to ensure that the permeate stream generated by the membrane contains a threshold amount of the biocide.

The amount of biocide present in the permeate stream downstream of the membrane may vary based on various factors, e.g., such as the flow rate of the feed stream and permeate stream, the addition rate of the biocide, and the amount of biocide consumed by reactive species between addition and measurement. The biocide added to the feed stream may be consumed through reaction with biological species present in the feedwater and/or biofouling present on the surfaces the feed stream contacts, such as the membrane. The biocide may also be consumed through reaction with nonbiological species present in the feedwater.

In some systems, the feed stream for the membrane separation process may undergo a preliminary disinfection treatment upstream of the membrane (e.g., upstream of where the biocide is injected into the feed stream). The disinfection treatment may involve introducing an oxidizing species into the feed stream to disinfect the feed stream. Since an oxidizing species added to the feed stream may have a tendency to damage the membrane itself, a reducing agent may subsequently be added to the feed stream before the membrane. Residual reducing agent present in the feed stream can react with the biocide added to the feed stream, reducing the amount of biocide present in the permeate downstream of the membrane. This can create problems when trying to control the amount of biocide in the permeate stream to be at or above a target level.

When the biocide added to the feed stream reacts with residual reducing agent present in the feed stream, the concentration of biocide present in the permeate stream will be reduced. As a result, an increased amount of biocide may need to be introduced into the feed stream to achieve the same target concentration in the permeate stream as would be achieved were the excess reducing agent not present. Additionally, in practice, a time lag may exist between when changes in the amount of chemical agent added to the feed stream occur (e.g., changes in the amount of biocide) and when those changes reach equilibrium state in the system (e.g., when the changes reach equilibrium state in the permeate stream generated by the membrane). This time lag can create dynamic dosing control challenges, e.g., when the concentration of biocide in the permeate stream fluctuates due to changing consumption rates, such as when the amount of residual reducing agent in the feed steam is not well controlled.

Accordingly, in some applications, the described systems and technique involve measuring the concentration of the oxidizing agent downstream of the location where the oxidizing agent is injected into the stream. The amount of reducing agent added to the feed stream can then be controlled based on the measured amount of oxidizing agent. For example, the amount of reducing agent may be controlled so that there is little or no excess reducing agent added to the feed stream. The charge neutral biocide can be introduced to the feed stream at a location downstream of where the reducing agent is added to the feed stream, e.g., at a location sufficiently far away from where the reducing agent is added to provide a residence time allowing substantially all of the reducing agent to react. In this way, the concentration of biocide in the permeate stream can be well controlled based on a feedback control loop between the measured concentration of biocide in the permeate stream and the dosing rate of biocide in the feed stream, e.g., with minimal fluctuations due to variable residual reducing agent concentrations.

Figure 1:
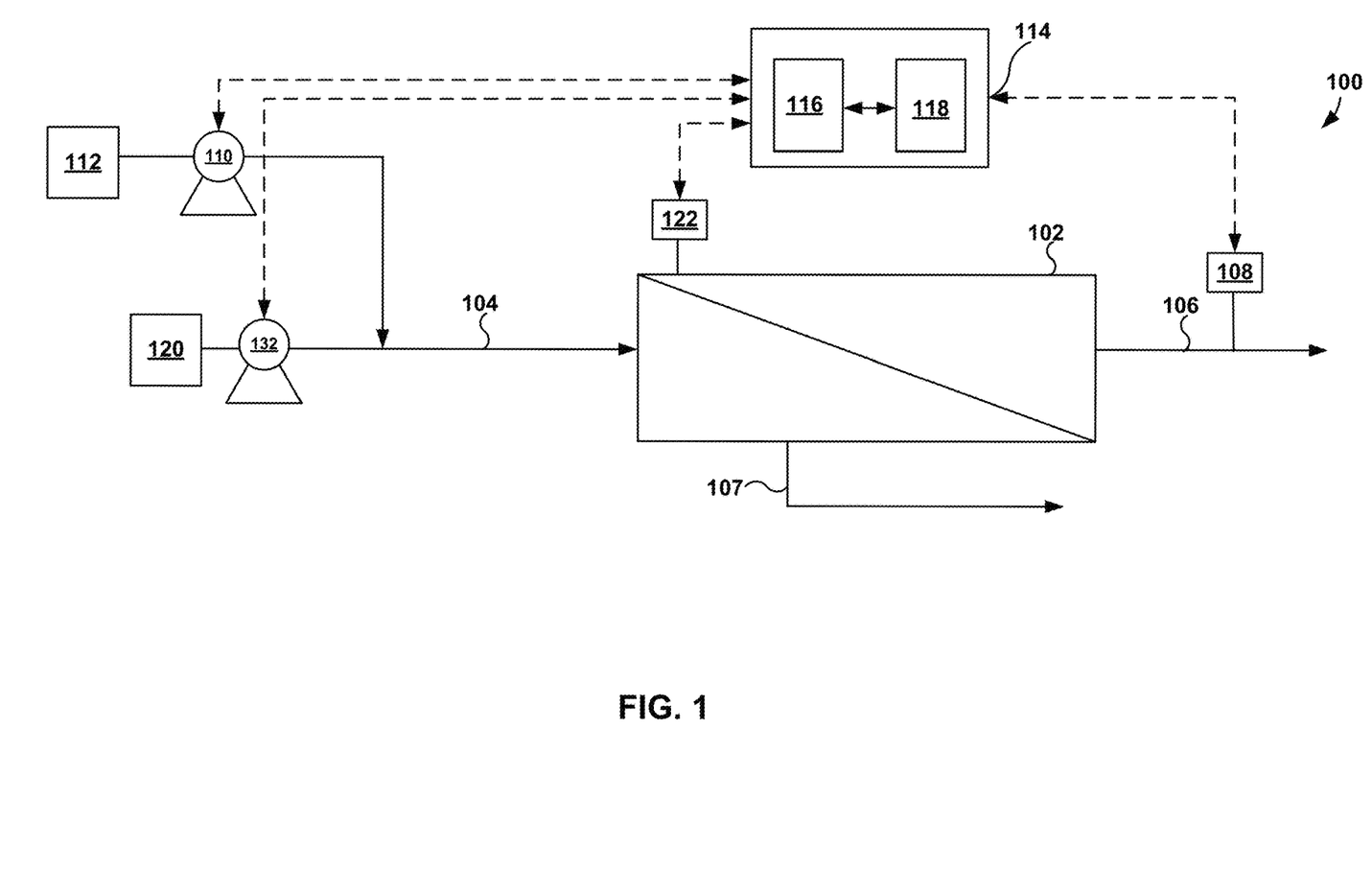
FIG. 1 is a conceptual diagram illustrating an example membrane separation system in which a biocide is controllably added.

FIG. 1 is a conceptual diagram illustrating an example membrane separation system 100 in which a biocide is controllably added. System 100 includes a separation membrane 102 that receives a feed stream from a fluid pathway 104. During operation of system 100, membrane 102 can be contacted with fluid to be purified from to remove ions, molecules, pathogens, and/or other particulate contaminants. For example, a feed stream flowing through fluid pathway 104 to membrane 102 can contain various solutes, such as dissolved organics, dissolved inorganics, dissolved solids, suspended solids, the like or combinations thereof. Membrane 102 can treat or purify the feed stream supplied to the membrane by dividing the feed stream into at least a first stream and a second stream, such as a permeate stream 106 and a concentrate stream 107 (which may also be referred to as a reject stream). Upon separation of the feed stream into permeate stream 106 and concentrate stream 107, in membrane 102, the permeate stream 106 can contain a substantially lower concentration of dissolved and/or suspended solutes as compared to the feed stream. On the other hand, the concentrate stream 107 can have a higher concentration of dissolved and/or suspended solutes as compared to the feed stream. In this regard, the permeate stream 106 represents a purified feed stream, such as a purified aqueous feed stream.

In the illustrated example, a sensor 108 can measure a concentration of a biocide in permeate stream 106 flowing through a fluid pathway that conveys the permeate stream away from the membrane. A biocide pump 110 can pump a biocide 112 into the feed stream based on the concentration of biocide measured by sensor 108. A controller 114 can be communicatively coupled to various components within membrane separation system 100 to manage the overall system.

For example, controller 114 can be communicatively connected to sensor 108, biocide pump 110, and optionally any other controllable components or sensors that may be desirably implemented in system 100. Controller 114 can include processor 116 and memory 118. Controller 114 can communicate with controllable components in system 100 via connections. For example, signals generated by sensor 108 may be communicated to controller 114 via a wired or wireless connection, which in the example of FIG. 1 is illustrated as a wired connection. Memory 118 can store software for running controller 114 and may also store data generated or received by processor 116, e.g., from sensor 108. Processor 116 can run software stored in memory 118 to manage the operation of system 100.

As described in greater detail below, the amount of biocide 112 delivered to the feed stream supplied to separation membrane 102 can be controlled based on the concentration of the biocide measured in permeate stream 106 via sensor 108. Operating under the control of controller 114, sensor 108 may measure a concentration of biocide in the permeate stream downstream of membrane 102, which is also downstream of an injection location where biocide 112 is introduced into feed stream 104. This can provide a measured biocide concentration in the permeate stream. Controller 114 may control biocide pump 110 to adjust an addition rate of the biocide to the feed stream based on the measured biocide concentration in the permeate stream.

For example, controller 114 may receive a target biocide concentration for the permeate stream 106. Controller 114 may then control biocide pump 110 based on the concentration of biocide measured via sensor 108 and the target biocide concentration. Controller 114 may control biocide pump 110 to deliver an amount of biocide to the feed stream effective to achieve (e.g., equal or exceed) the target concentration for the biocide in the permeate stream.

System 100 and membrane 102 can be configured for any desired type of membrane separation process, including cross flow separation processes, dead-end flow separation processes, reverse osmosis, ultrafiltration, microfiltration, nanofiltration, electrodialysis, electrodeionization, pervaporation, membrane extraction, membrane distillation, membrane stripping, membrane aeration and the like or combinations thereof. Typically, however, system 100 and membrane 102 may be implemented as a reverse osmosis, ultrafiltration, microfiltration, or nanofiltration membrane separation process.

In reverse osmosis, the feed stream is typically processed under cross flow conditions. When so configured, the feed stream may flow substantially parallel to the membrane surface such that only a portion of the feed stream diffuses through the membrane as permeate. The cross flow rate is typically high in order to provide a scouring action that lessens membrane surface fouling. This can also decrease concentration polarization effects (e.g., concentration of solutes in the reduced-turbulence boundary layer at the membrane surface, which can increase the osmotic pressure at the membrane and thus can reduce permeate flow). The concentration polarization effects can inhibit the feed stream water from passing through the membrane as permeate, thus decreasing the recovery ratio, e.g., the ratio of permeate to applied feed stream. A recycle loop(s) may be employed to maintain a high flow rate across the membrane surface.

System 100 can employ a variety of different types of membranes as membrane 102. Such commercial membrane element types include, without limitation, hollow fiber membrane elements, tubular membrane elements, spiral-wound membrane elements, plate and frame membrane elements, and the like. Typical polymeric materials used to fabricate a membrane element include cellulose acetate and polyamide. Reverse osmosis typically uses spiral wound elements or modules, which are constructed by winding layers of semi-porous membranes with feed spacers and permeate water carriers around a central perforated permeate collection tube. Typically, the modules are sealed with tape and/or fiberglass over-wrap. The resulting construction may have one channel that can receive an inlet flow. The inlet stream flows longitudinally along the membrane module and exits the other end as a concentrate stream. Within the module, water can pass through the semi-porous membrane and is trapped in a permeate channel, which flows to a central collection tube. From this tube it can flow out of a designated channel and is collected.

In different applications, membrane 102 can be implemented using a single membrane element or multiple membrane elements depending on the application. For example, multiple membrane elements may be used forming membrane modules that are stacked together, end to end, with inter-connectors joining the permeate tubes of the first module to the permeate tube of the second module, and so on. These membrane module stacks can be housed in pressure vessels. Within the pressure vessel, the feed stream can pass into the first module in the stack, which removes a portion of the water as permeate water. The concentrate stream from the first membrane can then become the feed stream of the second membrane and so on down the stack. The permeate streams from all of the membranes in the stack can be collected in the joined permeate tubes.

Within most reverse osmosis systems, pressure vessels may be arranged in either "stages" or "passes." In a staged membrane system, the combined concentrate streams from a bank of pressure vessels can be directed to a second bank of pressure vessels where they become the feed stream for the second stage. Commonly, systems have two to three stages with successively fewer pressure vessels in each stage. For example, a system may contain four pressure vessels in a first stage, the concentrate streams of which feed two pressure vessels in a second stage, the concentrate streams of which in turn feeds one pressure vessel in the third stage. This is designated as a "4:2:1" array. In a staged membrane configuration, the combined permeate streams from all pressure vessels in all stages may be collected and used without further membrane treatment. Multi-stage systems are commonly used when large volumes of purified water are required, for example for boiler feed water. The permeate streams from the membrane system may be further purified by ion exchange or other means.

In a multi-pass system, the permeate streams from each bank of pressure vessels are collected and used as the feed to the subsequent banks of pressure vessels. The concentrate streams from all pressure vessels can be combined without further membrane treatment of each individual stream. Multi-pass systems are typically used when very high purity water is required, for example in the microelectronics or pharmaceutical industries. When system 100 is implemented as a reverse osmosis process, one or more membranes 102 may be configured as a multi-stage and/or multi-pass system.

While system 100 and membrane 102 may be implemented in a cross-flow filtration process, in other configurations, the system may be arranged for conventional filtration of suspended solids by passing the feed stream through a filter media or membrane in a substantially perpendicular direction. This arrangement can create one exit stream (e.g., purified stream 106) during the service cycle. Periodically, the filter may be backwashed by passing a clean fluid in a direction opposite to the feed, generating a backwash effluent containing species that have been retained by the filter. In this arrangement, system 100 may have a feed stream, a purified stream, and a backwash stream. This type of membrane separation is typically referred to as dead-end flow separation and is typically limited to the separation of suspended particles greater than about one micron in size.

System 100 includes one or more sensors 108, which in the illustrated example is shown as a single sensor, to measure a concentration of biocide 112 in permeate stream 106. Sensor 108 can be positioned to measure the concentration of biocide 112 at a location downstream of membrane 102. For example, in typical systems utilizing multiple membrane elements depending on the application, sensor 108 may be positioned to measure the concentration of biocide in the combined permeate stream from all of the individual membrane elements.

A variety of different sensor instruments may be used as sensor 108. In general, any sensor that can measure a concentration of biocide 112 in the permeate stream can be used as sensor 108. Sensor 108 can be configured to directly measure the concentration of biocide 112 in permeate stream 106, e.g., by measuring a signal related to the reaction of the biocide with a reagent during titration or other reactive analysis. Example of such sensors include, but are not limited to, a potentiostatic sensor, a galvanostatic sensor, an amperometric sensor, and/or an optical sensor. Additional or alternatively, sensor 108 can be configured to indirectly measure the concentration of biocide 112 in permeate stream 106, e.g., by measuring a bulk fluid property of permeate stream 106 that varies based on the amount of biocide present in the stream. Examples of such sensors include a pH sensor, an oxidation-reduction potential (ORP) sensor, and/or a conductivity sensor.

System 100 may include a variety of other sensors in addition to or in lieu of sensor 108. For example, system 100 may include one or more flow meters to measure a flow rate of feed stream 104 and/or permeate stream 106. Instead of measuring flow rate via a flow meter, controller 114 may be communicatively connected to one or more pumps in system 100 and may receive an indication of the flow rate of a particular stream based on an operating rate of a pump providing that stream. In the configuration of FIG. 1, system 100 is illustrated as including a pump 132 for pressurizing the feed stream 104 supplied to membrane 102. Controller 114 may be informed of a flow rate flowing through various fluid pathways of system 100 based on a known operating rate of one or more pumps and a known fluid flow rate corresponding to the operating rate, e.g., which may be stored in memory 118.

In either case, controller 114 may control biocide pump 110 based on the flow rate of a stream (e.g., feed stream 104, permeate stream 106), e.g., in addition to controlling the pump based on the biocide concentration measured in the permeate stream by sensor 108. Controller 114 may control biocide pump 110 to increase or decrease the amount of biocide 112 added to feed stream 104 in proportion to an increase or decrease, respectively, in the flow rate of the stream.

As another example, system 100 may include a biofilm monitoring device 122 configured to directly or indirectly measure biofilm grown within membrane separation system 100. Controller 114 can control biocide pump 110 based on biofilm growth information generated by biofilm monitoring device 122. For example, controller 114 can control biocide pump 110 to increase the amount of biocide 112 introduced into feed stream 104 if biofilm monitoring device 122 indicates an increase in biofilm growth or, conversely, control biocide pump 110 to decrease the amount of biocide 112 introduced into the feed stream if biofilm monitoring device 122 indicates a decrease in biofilm growth. Controller 114 can control biocide pump 110 based on biofilm activity information generated by biofilm monitoring device 122 in addition to or in lieu of controlling the biofilm pump based on biocide concentration measurement information in permeate stream 106 generated by sensor 108.

For example, controller 114 may primarily control biocide pump 110 based on biocide measurement information generated by sensor 108, e.g., to achieve a target biocide concentration in the permeate stream. However, controller 114 may override the set point for biocide pump 110 that would otherwise be used to achieve the target biocide concentration for the permeate stream based on data from biofilm monitoring device 122. For example, if biofilm monitoring device 122 indicates increased biofilm growth activity, controller 114 may increase the amount of biocide 112 introduced into feed stream 104 in excess of and/or independent of the amount that would otherwise be introduced to achieve the target biocide concentration in the permeate stream. Controller 114 may reference instructions stored in memory 118 relating measurement information provided by biofilm monitoring device 122 to corresponding dosing control instructions for biocide pump 110. In other implementations of system 100, controller 114 may control biocide pump 110 based on measurement information generated by biofilm monitoring device 122 alone without controlling biocide addition based on the concentration of biocide in permeate stream 106.

Biofilm monitoring device 122 may be any device that directly measures a depth of a biological film forming on the surface of membrane 102 or indirectly measures an indicator (e.g., in feed stream 104, permeate stream 106, and/or concentrate stream 107) corresponding to the depth of a biological film forming on the surface membrane 102. Device 122 may be inserted into one or more membrane elements of membrane 102 to directly measure a depth of biofilm forming on the surface of the membrane. Examples of such sensors include electrochemical sensors, optical sensors, ultrasound sensors, x-ray sensors, and/or spectroscopy sensors. Controller 114 make compare a depth of the biofilm measured on membrane 102 by biofilm monitoring device 122 to one or more threshold depths (e.g., stored in memory 118). If the measured depth of the biofilm is above the threshold, controller 114 may control biocide pump 110 to increase an amount of biocide added to feed stream 104. If the measured depth of the biofilm is below the threshold (e.g., remains below the threshold for certain period of time and/or certain number of measurement intervals), controller 114 may control biocide pump 110 to decrease the amount of biocide added to feed stream 104.

Additionally or alternatively, biofilm monitoring device 122 may measure an indirect indicator of the amount of biofilm formed on the surface of an element of membrane 102. For example, biocide monitoring device 122 may measure adenosine triphosphate (ATP), nicotinamide adenine dinucleotide (NAD) and/or its reduced form NADH, and/or yet chemical marker indicative of biofilm formation and biocide demand. Biofilm monitoring device 122 can measure such indirect indicator(s) of biofilm formation inside membrane 102 (e.g., in the liquid present within the housing containing the membrane element and/or in the biofilm formed on the surface the membrane) and/or in permeate stream 106 produced by the membrane. A variety of example devices can be used as device 122 to indirectly measure indicators of biofilm, such as a device that performs plate counting on concentrate stream 107 to count the microorganisms coming out of membrane 102. If the indirect indicator of biofilm formation measured by biofilm monitoring device 122 increases, controller 114 may control biocide pump 110 to increase an amount of biocide added to feed stream 104. If the indirect indicator of biofilm formation measured by biofilm monitoring device 122 decreases or remains constant, controller 114 may control biocide pump 110 to decrease the amount of biocide added to feed stream 104.

As noted above, controller 114 can control the addition of biocide 112 to feed stream 104 based on a concentration of the biocide in permeate stream 106 measured by sensor 108. Controller 114 can compare the concentration of biocide in permeate stream 106 measured by sensor 108 to a minimum target biocide concentration for the permeate (e.g., stored in memory 118). Based on the comparison, controller 114 can control biocide pump 110 to adjust an addition rate of biocide 112 to the feed stream. After making changes to the dosing rate of biocide pump 110, a period of time sufficient to allow equilibrium biocide concentration conditions to be established in the permeate stream may pass before a subsequent concentration measurement by sensor 108 and corresponding control action are taken.

During operation, controller 114 can control biocide pump 110 to introduce biocide to feed stream 104 at a first addition rate. In response to determining that the concentration of biocide measured in permeate stream 106 is below a minimum target biocide concentration for the permeate, controller 114 may control biocide pump 110 to increase the addition rate/amount of biocide added to the feed stream to a second addition rate greater than the first addition rate. If controller 114 determines that the concentration of biocide measured in permeate stream 106 is above a maximum target biocide concentration for the permeate, controller 114 may control biocide pump 110 to decrease the addition rate/amount of biocide added to the feed stream to a second addition rate less than the first additional rate. Controller 114 may maintain a constant dosing rate for biocide pump 110 if the measured concentration of biocide in permeate stream 106 is between minimum and maximum targets.

Controller 114 may be informed of one or more target biocide concentrations for permeate stream 106 from a user via a user interface (which can be physically coupled to or remote from and communicatively coupled to controller 114). For example, in use, an operator of system 100 may desire that permeate stream 106 contain a certain amount of biocide, e.g., effective to provide biocidal efficacy and microbial control to the system. For these and other reasons, the operator may set a target concentration for the permeate stream 106. Controller 114 may be informed of the target concentration for the feed stream in various ways. The target concentration may be programmed into controller at manufacturing or set up, and/or once deployed within system 100. Controller 114 may be informed of the target concentration from a user via a user interface communicatively coupled to the controller (e.g., on-site or from a location remote from where the controller is located) or may receive information concerning the target concentration from one or more other systems or sensors within the operating environment where system 100 is located.

System 100 can operate with any desired target biocide concentrations for permeate stream. The specific target value(s) may vary depending on the type of biocide used. In some examples, such as when the biocide is chlorine dioxide, a target biocide concentration for feed stream 104 may be of value falling within a range from 0.001 ppm to 10 ppm, such as from 0.1 ppm to 1 ppm. In various examples, the target biocide concentration for feed stream 104 may be a value less than 10 ppm, such as less than 1 ppm, or less than 0.1 ppm.

Sensor 108 used in system 100 can be implemented in a number of different ways in the system. In some examples, a pipe, tube, or other conduit is connected between a fluid pathway through which the permeate stream flows to the sensor, e.g., providing a slip stream or sample stream from the bulk of flowing liquid. As fluid moves through the permeate fluid pathway, a portion of the fluid may enter the conduit and pass adjacent to and/or in contact with sensor 108, thereby allowing the sensor to measure a concentration of biocide in the fluid. In alternative configurations, sensor 108 can be positioned in-line with a permeate fluid pathway, e.g., allowing the sensor to directly sample and/or analyze the permeate stream flowing through the fluid pathway without drawing a slip stream. In still other applications, sensor 108 may be used to analyze a stationary volume of fluid that does not flow through and/or in contact with the sensor. For example, in these alternative configurations, sensor 108 may be implemented as an offline monitoring tool (e.g., as a handheld sensor), that requires filling the sensor with a fluid sample manually extracted from system 100.

Biocide 112 introduced to feed stream 104 may be a single biocide or a combination of biocides. Biocide 112 may include an oxidizing biocide and/or a non-oxidizing biocide, which in each case may include a halogen such as bromine or chlorine. Example chlorine and bromine-type oxidizers that be used as biocide 112 include: chlorine, chlorine dioxide, hypochlorous acid and the salts thereof, chlorous acid and the salts thereof, chloric acid and the salts thereof, perchloric acid and the salts thereof, chlorinated isocyanuric acid and the salts thereof, hypobromous acid and the salts thereof, bromous acid and the salts thereof, bromic acid and the salts thereof, perbromic acid and the salts thereof, brominated isocyanuric acid and the salts thereof, and combination thereof. As salts, the alkali metal salts of hypochlorous acid and hypobromous acid such as sodium hypochlorite, sodium hypobromite, potassium hypochlorite and potassium hypobromite; the alkaline earth metal salts of hypochlorous acid and hypobromous acid such as calcium hypochlorite, calcium hypobromite, barium hypochlorite and barium hypobromite; the alkali metal salts of chlorous acid and bromous acid such as sodium chlorite, sodium bromite, potassium chlorite and potassium bromite; the alkaline earth metal salts of chlorous acid and bromous acid such as calcium chlorite, calcium bromite, barium chlorite and barium bromite; other metal salts of chlorous acid and bromous acid such as nickel chlorite; ammonium chlorate and ammonium bromate; the alkali metal salts of chloric acid and bromic acid such as sodium chlorate, sodium bromate, potassium chlorate and potassium bromate; the alkaline earth metal salts of chloric acid and bromic acid such as calcium chlorate, calcium bromate, barium chlorate and barium bromate can be listed. One of these chlorine and bromine-type oxidizers can be used alone or two or more of these chlorine and bromine-type oxidizers can be combined to use.

Example non-oxidizing biocides that may be used as biocide 112 include bromine-containing biocides, such as 2,2-dibromo-3-nitrilopropionamide (DBNPA) and 2-bromo-2-nitro-1,3-propanediol ("bronopol"). Another example non-oxidizing biocides that may be used as biocide 112 is isothiazolone.

In some examples, biocide 112 is selected from the group consisting of chlorine, chlorine dioxide, chloramine (e.g., monochoramine), bromine, stabilized bromine, and combinations thereof. A stabilized bromine can be bromine combined with one or more of sulfamic acid, cyauric acid, ammonia, and dimethylhydantoin, including combinations thereof. For instance, in various examples, the biocide 112 may consistent essentially of chlorine, or may consistent essentially of chlorine dioxide, or may consist essentially of chloramine.

In instances where biocide 112 is selected to substantially pass through membrane 102 into permeate stream 106, the biocide may be selected to be a charge neutral biocide. As used herein, the term "charge neutral biocide" means a biocide that does not have a net electrical charge in its molecular structure when measured at a neutral pH. Examples of charge neutral biocides include, but are not limited to, chlorine dioxide, chloramines, performic acid, peracetic acids, ozone, and combinations thereof.

The charge neutral biocide may pass through membrane 102 without electrically interacting with and being separated to concentrate stream 107 by the membrane (e.g., a membrane having positively and/or negatively charged molecular groups incorporated into the membrane matrix). In some examples, at least 50 percent on a molar basis of the biocide added to feed stream 104 passes to permeate stream 106, such as at least 60 percent, at least 75 percent, at least 80 percent, or at least 90 percent. For example, from 5 to 25 percent of the biocide added to feed stream 104 may be separated into concentrate stream 107 (such as from 10 to 20 percent of the biocide) with the remaining majority of the biocide passing to the permeate stream.

Biocide 112 may be supplied from any type of source reservoir including, e.g., a pail, a drum, a cylinder, a tote, solid feeder system, and/or a hands-free delivery chemical delivery system, such as PORTA-FEED® from Nalco, an Ecolab Company. The reservoir may store a liquid, a solid (e.g., powder), and/or a gas. In examples in which biocide 112 is provided in a solid and/or gaseous form, biocide pump 110 may be replaced with a different type of metering device configured to deliver the gas and/or solid chemical agent to an intended discharge location.

System 100 can be used to purify any desired type of fluid. Example aqueous (water-based) liquid feed sources 120 that may be purified using system 100 include raw water streams (e.g., extracted from a fresh water source), waste water and recycle water streams (e.g., from municipal and/or industrial sources), streams in food and beverage processes, streams in pharmaceutical processes, streams in electronic manufacturing, streams in utility operations, streams in pulp and paper processes, streams in mining and mineral processes, streams in transportation-related processes, streams in textile processes, streams in plating and metal working processes, streams in laundry and cleaning processes, streams in leather and tanning processes, streams in paint processes, and combinations thereof. Liquid from source 120 may include microorganisms that have a tendency to cause fouling in system 100, such as bacteria (e.g., *Legionella, Shigella, Escherichia coli, Vibrio, Salmonella, Mycobacterium,* Pseudomonads), viruses (e.g., Norwalk virus, rotaviruses), protozoans (e.g., *Entamoeba, Giardia, Cryptosporidium*), and combinations thereof.

In some examples, liquid feed source 120 may provide an aqueous liquid feed that contains comparatively high levels of metal ions. At least a portion of these metal ions may be removed by membrane 102 by contacting the membrane with the feed liquid. When using an oxidizing biocide 112 (e.g., chloramine, chlorine dioxide, hydrogen peroxide, peroxyacetic acid, performic acid), however, one or more metal ions present in the liquid feed may function as a catalyst that catalyzes oxidation reactions with the membrane 102 itself (material forming the membrane) by biocide 112. This can cause premature degradation and failure of membrane 102.

Accordingly, in some implementations, the feed liquid for membrane 102 supplied by liquid feed source 120 may be analyzed to measure a concentration of one or more metal ions present in the liquid. The one or more metal ions may be metal ions that catalyze degradation (e.g., oxidation) reactions with membrane 102. Examples of such metal ions may include iron, manganese, aluminum, cobalt, molybdenum, silver, zinc, copper, nickel, chromium, and combinations thereof. In one example, the feed liquid is analyzed to measure a total metal ion concentration in the feed liquid, which is a sum of the concentrations of each of the metal ions catalyzing degradation reactions with membrane 102 (e.g., a sum of the concentrations of each of the foregoing listed metal ions).

The concentration of the metal ion(s) in the feed liquid can be measured using a number of different instruments and techniques. The concentration of one or more metals can be measured using one or more in-line sensors and/or offline sensors, e.g., as discussed herein. The concentration of one or more metals may be measured using an optical sensor (e.g., with or without titration), electrochemical sensor, spectroscopy, chromatography, and/or using any other measurement instrumentation.

The concentration of a measured metal ion, or a combined concentration of multiple metal ions (e.g., total metal ion concentration), can be compared against a threshold. The threshold may correspond to a metal ion concentration in the feed liquid above which one or more pretreatment steps may be implemented to reduce the metal ion concentration in the feed liquid prior to contacting membrane 102. In various examples, the threshold may be a metal ion concentration (either for a single metal ion or for a combination of multiple metal ions) of 1.0 ppm metal or less, such as 0.5 ppm or less, 0.2 ppm or less, or 0.1 ppm or less. Pretreatment can be implemented if the measured metal ion concentration in the feed liquid exceeds the threshold. For example, if the threshold corresponds to a total metal ion concentration 0.2 ppm, pretreatment may be implemented if the measured total metal ion concentration in the feed liquid exceeds 0.2 ppm. In some examples, a system controller (e.g., controller 114) receives measurement information from one or more instruments providing a measured metal ion concentration, compares the measured metal ion concentration to the threshold, and initiates pretreatment based on the comparison.

One or more treatment steps can be implemented upstream of membrane 102 that condition the feed liquid from source 120 to reduce the concentration of one or more metal ions in the feed liquid (e.g., in addition to any other pretreatment steps that may normally be performed on the feed liquid). One example treatment step that can be implemented is the addition of a chemical agent to the feed liquid that deactivates the catalytic activity of the one or more metal ions (e.g., by binding the one or more metal in-situ and/or by forming a metal ion-containing precipitate that is removed from the feed liquid). Examples of such chemical agents include coagulants, chelating agents, and the like. Additionally or alternatively, a pre-filtration step may be implemented upstream of membrane 102 to remove metal ions from the feed liquid prior to contacting the membrane. Example pre-treatment steps may include, but are not limited to sand filtration, multimedia filtration, microfiltration (MF), ultrafiltration (UF), and combinations thereof. The one or more treatment steps may be effective to reduce the concentration of the one or more metal ions in the feed liquid from a concentration level above the threshold to a concentration level at or below the threshold.

Features describes as pumps in system 100 (e.g., biocide pump 110) may be any form of pumping mechanism that supplies fluid from a fluidly connected reservoir. For example, the pump may comprise a peristaltic pump or other form of continuous pump, a positive-displacement pump, or any other type of pump appropriate for the particular application.

Features described as fluid pathways in system 100 may be any type of flexible or inflexible tubing, piping, or conduit. The fluid pathways may typically be formed of metal (e.g., copper, steel such as stainless steel, lead), polymeric and crosslinked polymeric material (e.g., polyvinyl chloride, polypropylene, polyethylene), and/or ceramic materials. Oftentimes, each fluid pathway may be implemented with multiple individual segments of piping joined together with fluid-tight connections.

As briefly discussed above, in some applications, liquid from source 120 forming feed stream 104 may undergo disinfection before contacting membrane 102. The pretreatment disinfection process may be implemented to kill or otherwise deactivate biological and/or chemical contaminants in the water forming feed stream 104.

Figure 2:
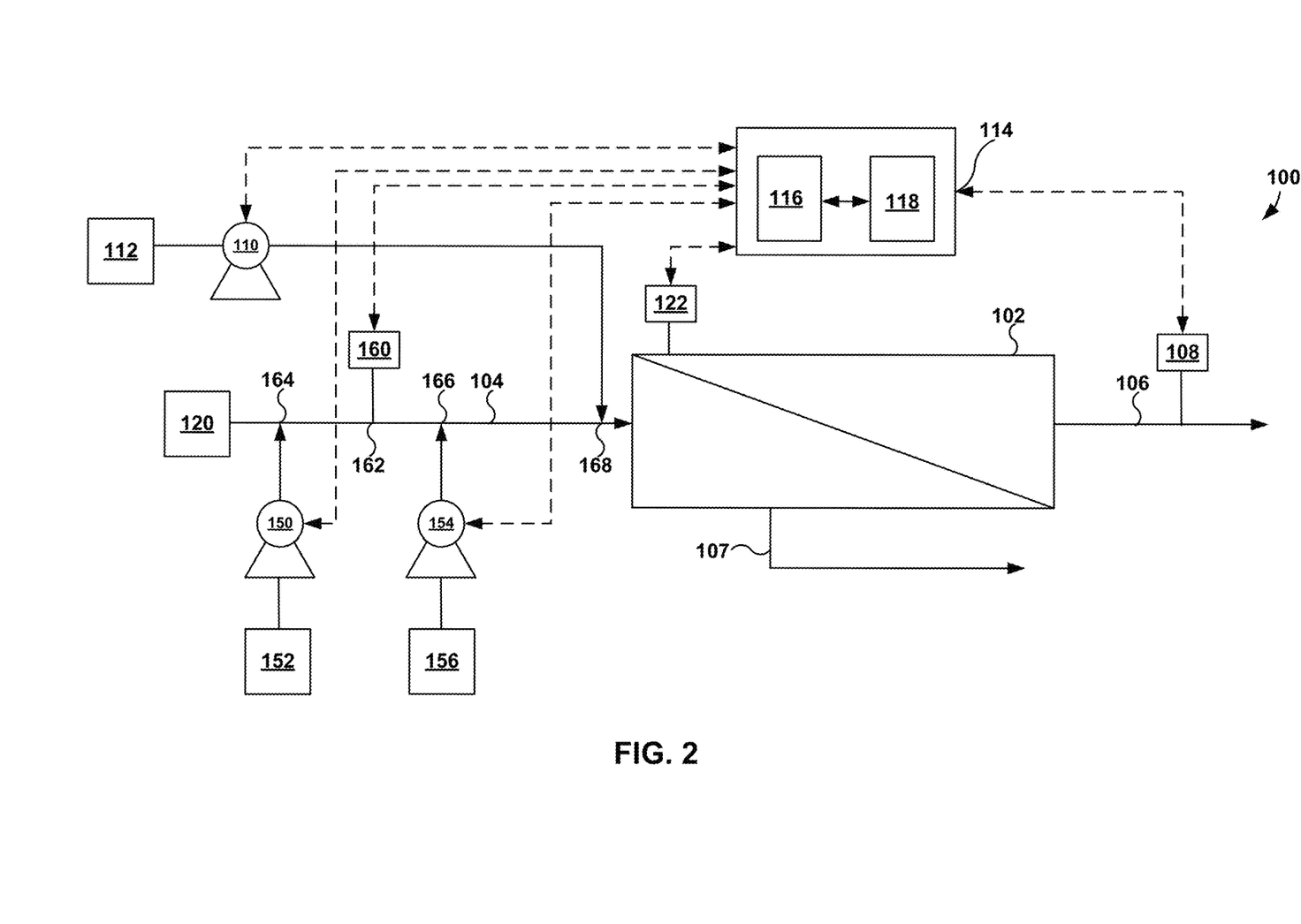
FIG. 2 is a conceptual diagram illustrating an example implementation of the membrane separation system from FIG. 1 with the addition of a pretreatment step in which an oxidizing and reducing agent are added to the feed stream.

FIG. 2 is a conceptual diagram illustrating an example implementation of membrane separation system 100 from FIG. 1 with the addition of a pretreatment step in which an oxidizing and reducing agent are added to the feed stream (e.g., the liquid that is subsequently supplied to membrane 102). Like reference numerals in FIG. 2 refer to like elements discussed above with respect to FIG. 1.

In the example of FIG. 2, system 100 includes an oxidizing agent pump 150 positioned to introduce an oxidizing agent 152 into the liquid forming feed stream 104 and a reducing agent pump 154 positioned to introduce a reducing agent 156 into the liquid forming feed stream 104. Reducing agent 156 may be added to feed stream 104 downstream of where oxidizing agent 152 is introduced into the feed stream.

In the illustrated example, system 100 includes an oxidizing agent sensor 160. Oxidizing agent sensor 160 can measure a concentration of one or more oxidizing agents in feed stream 104. Oxidizing agent sensor 160 can be positioned upstream of where reducing agent 156 is introduced into feed stream 104. Controller 114 can be communicatively connected to sensor 108, reducing agent pump 154, and optionally oxidizing agent pump 152. Controller 114 can control the reducing agent pump 154 to control the addition rate of reducing agent to the feed stream based on the concentration of oxidizing agent measured by oxidizing agent sensor 160.

In practice, oxidizing agent 152 may be added to the liquid defining feed stream 104 upstream of membrane 102, e.g., to disinfect the feed stream prior to contacting the membrane. Example agents that may be used, alone or in combination as oxidizing agent 152 include, but are not limited to, chlorine-containing compounds, bromine-containing compounds, peroxides, performic acid, and/or a peracetic. For example, oxidizing agent 152 may include an agent selected from the group of chlorine, bromine, a peroxide, a performic acid, a peracetic, a chloramine, a chlorosulfamic acid, a bromosulfamic acid, and combinations thereof. In some examples, oxidizing agent 152 is selected from the group consisting of chlorine, hypochlorite, chlorite, chlorate, monochloramine, dichloramine, trichloramine, a hydrogen peroxide, chlorosulfamate, bromosulfamate, ozone, permanganate, and combination thereof.

Oxidizing agent 152 may have biocidal properties, and any of the oxidizing biocides discussed above with respect to biocide 112 may be used as oxidizing agent 152. According, in some implementations, biocide 112 and oxidizing agent 152 are the same chemical species or combination of chemical species. In other implementations, biocide 112 and oxidizing agent 152 are different chemical species or combination of chemical species. For example, biocide 112 may be or include chlorine dioxide while oxidizing agent 152 may be or include hypochlorite.

Because many chemical compounds used as oxidizing agent 152 may have a tendency to damage membrane 102, reducing agent 156 may be added to the liquid defining feed stream 104 downstream of where the oxidizing agent is added to the liquid. The addition of reducing agent 156 may neutralize residual (e.g., unreacted) oxidizing agent present in liquid prior to contacting membrane 102. Example agents that may be used, alone or in combination as oxidizing agent 152 include, but are not limited to, a bisulfite (e.g., sodium bisulfate), a metabisulfite (e.g., sodium metabisulfite), a formaldehyde sulfite (e.g., sodium formaldehyde sulfite), a thiosulfate (e.g., sodium thiosulfate), and combinations thereof.

Oxidizing agent sensor 160 may be any sensor that can measure a concentration of oxidizing agent 152 (and, optionally, any other oxidizing species present in the liquid). Sensor 160 can be configured to directly measure the concentration of oxidizing agent in stream 104, e.g., by measuring a signal related to the reaction of the oxidizing agent with a reagent during titration or other reactive analysis. Additionally or alternatively, sensor 160 can be configured to indirectly measure the concentration of oxidizing agent in feed stream 104, e.g., by measuring a bulk fluid property of the feed stream that varies based on the amount of oxidizing agent present in the stream. Example sensors that can be used as oxidizing agent sensor 160 include electrochemical sensors and optical sensors. For instance, oxidizing agent sensor may be implemented using a chlorine sensor, a chloramine sensor, a pH sensor, and/or an oxidation-reduction potential (ORP) sensor. As discussed above with respect sensor 108, oxidizing agent sensor 160 may be implemented as an online monitoring tool or an off-line monitoring tool in different configurations.

In general, oxidizing agent sensor 160 may measure a concentration of oxidizing agent in feed stream 104 at a measurement location 162 downstream of where the oxidizing agent 152 is introduced into the feed stream. Measurement location 162 may be at a location sufficiently far away from oxidizing agent addition location 164 that the oxidizing has substantially fully reacted with any compounds that the oxidizing agent will react with before being analyzed by sensor 160. When so implemented, oxidizing agent sensor 160 can measure a concentration of residual oxidizing agent (and/or other oxidizing species) present in the feed stream, e.g., such that the concentration of oxidizing agent will not change significantly (e.g., greater than 10%, such as greater than 5%) after being measured.

Reducing agent 156 can be added to the feed stream at a reducing agent injection location 166 downstream of the measurement location 162. Operating under the control of controller 114, sensor 160 may measure a concentration of oxidizing agent in the feed stream. This can provide a measured residual oxidizing agent concentration in the stream. Controller 114 can control reducing agent pump 154 to adjust an addition rate of reducing agent 156 to the feed stream based on the measured oxidizing agent concentration in the stream. Controller 114 may control reducing agent pump 154 to introduce an amount of reducing agent effective to react substantially all of the oxidizing agent measured by oxidizing agent sensor 160 is still being present in the feed stream without introducing a significant excess of reducing agent to the feed stream.

For example, controller 114 may receive data indicative of a measured oxidizing agent concentration from oxidizing agent sensor 160. Controller 114 may determine an amount of reducing agent 156 needed to react substantially all the measured oxidizing agent present in feed stream 104, e.g., based on the measured concentration of oxidizing agent and the flow rate of the stream. Controller 114 may determine an amount of reducing agent 156 that is within a range of ±20% of an amount of the reducing agent need to react all oxidizing agent measured as being present in the feed stream, such as at ±10%, ±5%, or ±3%. Controller 114 can control reducing agent pump 154 to deliver the determined amount (e.g., rate) of reducing agent 156 to feed stream 104.

In response to determining a change in the amount of oxidizing agent measured by oxidizing agent sensor 160, controller 114 may control reducing agent pump 154 to increase or decrease the amount of reducing agent added to the feed stream. For example, controller 114 may determine a difference between the measured oxidizing agent concentration by oxidizing agent sensor 160 and the amount of the reducing agent needed to react all oxidizing agent measured in the feed stream. Controller 114 may then control reducing agent pump 154 to increase or decrease the addition rate of the reducing agent added to the feed stream based on the difference.

Reducing agent 156 can be introduced to feed stream 104 at a number of different locations. In some examples, reducing agent 156 is introduced at a reducing agent injection location 166 downstream of oxidizing agent sensor 160 and upstream of an injection location 168 where biocide 112 is introduced to the feed stream. Reducing agent injection location 166 may be located a sufficient distance upstream from injection location 168 to provide sufficient residence time for the reducing agent to substantially completely react with the oxidizing agent present in the feed stream prior to introduction of biocide 112. This can help ensure that the reducing agent injected into the feed stream reacts with residual oxidizing agent and not biocide 112, which is desired to remain in the feed stream for contacting membrane 102 and/or for passing through the membrane in permeate stream 106.

While oxidizing agent 152 and reducing agent 156 have been described in the foregoing discussion as being added to feed stream 104, it should be appreciated that the arrangement of injection locations and timing of injection may be different than discussed above without departing from the scope of the disclosure. For example, oxidizing agent 152 and/or reducing agent 156 need not be injected in-line with the liquid flowing through the fluid conduit defining feed stream 104 that is then sent to membrane 102. Rather, oxidizing agent 152 and/or reducing agent 156 may be added to the liquid from source 120 at any location prior to contacting membrane 102 and still be characterized as being added to the flow stream. As another example, in applications where the liquid from source 120 is already disinfected and/or contains a comparatively high concentration of oxidizing species, additional oxidizing agent 152 may not be introduced into the feed stream. In these examples, reducing agent 156 may be added to neutralize oxidizing species incoming with the source liquid.

Figure 3:
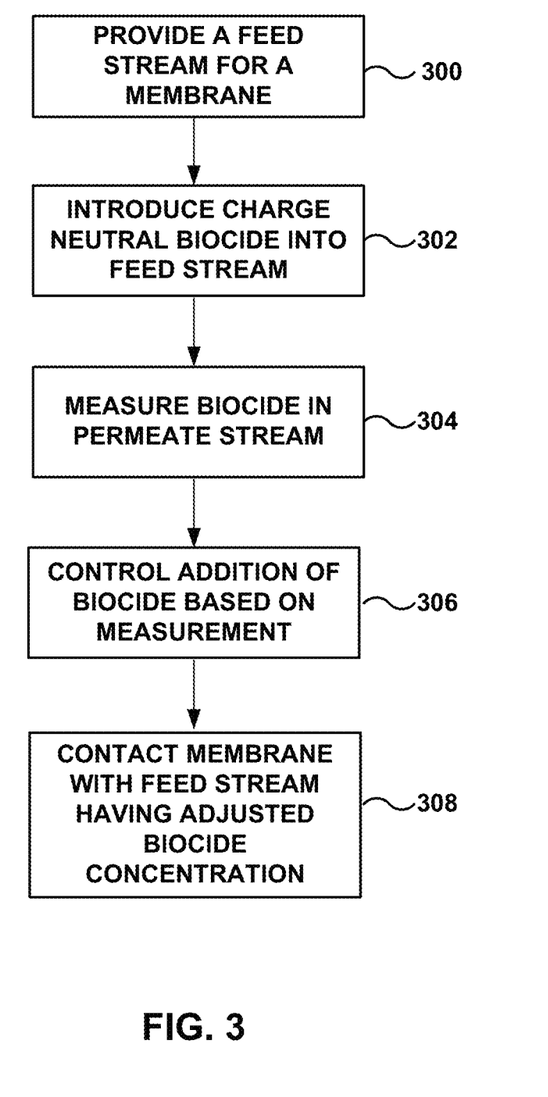
FIG. 3 is a flow diagram illustrating an example technique for controlling addition of a biocide in a membrane separation process.

FIG. 3 is a flow diagram illustrating an example technique for controlling addition of a biocide in a membrane separation process. The technique of FIG. 3 is described with reference to system 100 in FIGS. 1 and 2, although can be performed in other systems having other configurations, e.g., as described herein.

With reference to FIG. 3, the example technique involves providing a feed stream 104 for a membrane separation device (300). For example, liquid to be processed through membrane 102 can be pumped from a source 120 through a fluid conduit toward the membrane by pump 132. The feed stream 104 can be any feed stream desired to be purified using membrane 102.

The technique of FIG. 3 includes introducing a charge neutral biocide into the feed stream 104 (302). Operating under the control of controller 114, biocide pump 110 may pump an amount of charge neutral biocide 112 into feed stream 104 and/or liquid subsequently forming the feed stream. The biocide may be added to the feed stream 104 at a biocide addition location 168 downstream of where an oxidizing agent 152 and/or reducing agent 156 are earlier introduced.

One or more sensors 108 can analyze at least a portion of the permeate stream 106 generated by the membrane to determine a measured biocide concentration in the permeate stream (304). The biocide concentration measured by sensor 108 may vary based on a variety of factors, e.g., such as the amount of biofilm growth and biological activity in membrane 102 and the rejection efficiency of membrane 102 to the biocide.

In either case, controller 114 may control the addition of biocide 112 to feed stream 104 based on the biocide concentration measured by sensor 108 (306). In some examples, controller 114 is informed of a target biocide concentration for the permeate stream and determines a corresponding target biocide concentration for the secondary feed stream. Controller 114 can control biocide pump 110 based on the comparison between the target biocide concentration and the measured biocide concentration. Controller 114 may increase a biocide addition rate by biocide pump 110 if the measured biocide concentration is below the target concentration. By contrast, controller 114 may decrease a biocide addition rate by the pump if the measured biocide concentration is above a target concentration.

With the biocide 112 introduced into the feed stream 104 at an adjusted rate based on the measured biocide concentration by sensor 108, the feed stream can flow downstream to contact membrane 102, generating permeate stream 106 (308).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. For example, features described as controllers herein such as controller 114 using computing hardware physically co-located with membrane 102 or may be partially or fully physically remote from the membrane, such as implemented through a remote server, cloud-computing environment, or other physically remote computing device.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method of controlling addition of a biocide in a membrane separation process, the method comprising:

introducing a charge neutral biocide into a feed stream at a first addition rate;
contacting a membrane with the feed stream, thereby generating a permeate stream and a concentrate stream;
measuring a concentration of the charge neutral biocide in the permeate stream to provide a measured concentration of the charge neutral biocide in the permeate stream; and
adjusting an addition rate of the charge neutral biocide based on the measured concentration of the charge neutral biocide in the permeate stream to introduce the charge neutral biocide into the feed stream at a second addition rate different than the first addition rate.

2. The method of claim 1, wherein introducing the charge neutral biocide into the feed stream comprises introducing the charge neutral biocide into the feed stream at an injection location, and further comprising:
measuring a concentration of an oxidizing agent at a measurement location upstream of the injection location to provide a measured oxidizing agent concentration; and
controlling addition of a reducing agent to the feed stream based on the measured oxidizing agent concentration, wherein the reducing agent is added to the feed stream upstream of the injection location and downstream of the measurement location.

3. The method of claim 2, wherein controlling addition of the reducing agent to the feed stream based on the measured oxidizing agent concentration comprises introducing an amount of the reducing agent to the feed stream that is within a range of plus or minus 10 percent of an amount of the reducing agent needed to react all oxidizing agent measured in the feed stream.

4. The method of claim 3, wherein controlling addition of the reducing agent to the feed stream based on the measured oxidizing agent concentration comprises
determining a difference between the measured oxidizing agent concentration and the amount of the reducing agent needed to react all oxidizing agent measured in the feed stream, and
increasing or decreasing the amount of the reducing agent added to the feed stream based on the difference.

5. The method of claim 2, wherein the reducing agent is added to the feed stream at a reducing agent injection location, and the reducing agent injection location is located a distance upstream from the injection location for introducing the charge neutral biocide that is effective for the reducing agent to substantially completely react with the oxidizing agent prior to reaching the injection location.

6. The method of claim 2, further comprising introducing the oxidizing agent upstream of the measurement location.

7. The method of claim 2, wherein measuring the concentration of the oxidizing agent at the measurement location comprises measuring the concentration of the oxidizing agent by at least one of an electrochemical sensor and an optical sensor.

8. The method of claim 2, wherein the oxidizing agent is selected from the group consisting of chlorine, bromine, a peroxide, a performic acid, a peracetic, a chloramine, a chlorosulfamic acid, a bromosulfamic acid, and combinations thereof.

9. The method of claim 2, wherein the reducing agent comprises a bisulfate.

10. The method of claim 1, wherein the charge neutral biocide comprises chlorine dioxide.

11. The method of claim 1, wherein adjusting the addition rate of the charge neutral biocide based on the measured concentration of the charge neutral biocide in the permeate stream to introduce charge neutral biocide into the feed stream at the second addition rate different than the first addition rate comprises increasing an amount of the charge neutral biocide introduced into the feed stream.

12. The method of claim 1, wherein adjusting the addition rate of the charge neutral biocide based on the measured concentration of the charge neutral biocide in the permeate stream comprises:
determining a difference between the measured concentration of the charge neutral biocide in the permeate stream and a minimum charge neutral biocide concentration target for the permeate, and
increasing an amount of the charge neutral biocide added to the feed stream based on the difference.

13. The method of claim 12, wherein the minimum charge neutral biocide concentration target for the permeate is a value less than 10 ppm of charge neutral biocide.

14. A system comprising:
a biocide pump configured to introduce a charge neutral biocide into a feed stream;
a membrane configured to separate the feed stream into a permeate stream and a concentrate stream;
a sensor configured to measure a concentration of the charge neutral biocide in the permeate stream to provide a measured concentration of the charge neutral biocide in the permeate stream; and
a controller communicatively coupled to the biocide pump and the sensor, the controller being configured to control the biocide pump to adjust an addition rate of the charge neutral biocide into the feed stream based on the measured concentration of the charge neutral biocide in the permeate stream.

15. The system of claim 14, wherein the biocide pump is positioned to introduce the charge neutral biocide into the feed stream at an injection location, and further comprising:
an oxidizing agent sensor configured to measure a concentration of an oxidizing agent in the feed stream at a measurement location upstream of the injection location to provide a measured oxidizing agent concentration, and
a reducing agent pump configured to introduce a reducing agent into the feed stream upstream of the injection location and downstream of the measurement location,
wherein the controller is communicatively coupled to the oxidizing agent sensor and the reducing agent pump and configured to control the reducing agent pump to adjust an addition rate of the reducing agent into the feed stream based on the measured oxidizing agent concentration.

16. The system of claim 15, wherein the controller is configured to control the reducing agent pump to adjust the addition rate of the reducing agent into the feed stream based on the measured oxidizing agent concentration by at least controlling the reducing agent pump to introduce an amount of the reducing agent to the feed stream that is within a range of plus or minus 10 percent of an amount of the reducing agent needed to react all oxidizing agent measured in the feed stream.

17. The system of claim 15, wherein the controller is configured to control the reducing agent pump to adjust the addition rate of the reducing agent into the feed stream based on the measured oxidizing agent concentration by at least:
determining a difference between the measured oxidizing agent concentration and the amount of the reducing agent needed to react all oxidizing agent measured in the feed stream, and increasing or decreasing the addition rate of the reducing agent added to the feed stream based on the difference.

18. The system of claim 15, further comprising an oxidizing agent pump configured to introduce the oxidizing agent upstream of the measurement location.

19. The system of claim 14, wherein the controller is configured to control the biocide pump to adjust the addition rate of charge neutral biocide into the feed stream based on the measured concentration of the charge neutral biocide in the permeate stream by at least:
   determining a difference between the measured concentration of the charge neutral biocide in the permeate stream and a minimum charge neutral biocide concentration target for the permeate, the minimum charge neutral biocide concentration target for the permeate being a value less than 10 ppm of charge neutral biocide, and
   increasing the addition rate of the charge neutral biocide to the feed stream based on the difference.

20. The system of claim 14, wherein the membrane is a reverse osmosis membrane.

* * * * *